Dec. 21, 1965  B. E. SHLESINGER, JR  3,225,149
PROGRAMMING SYSTEM-CABLE TAPE TYPE SWITCH
WITH DEFLECTABLE SPRING CONTACT MEANS
Filed July 27, 1964
3 Sheets-Sheet 1
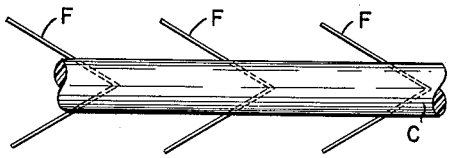
Fig.1
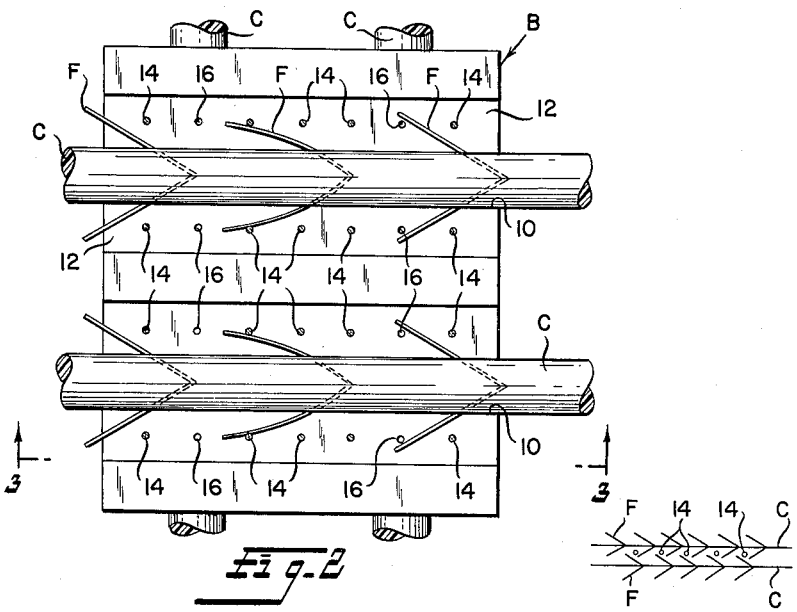
Fig.2
Fig.2A
Fig.3
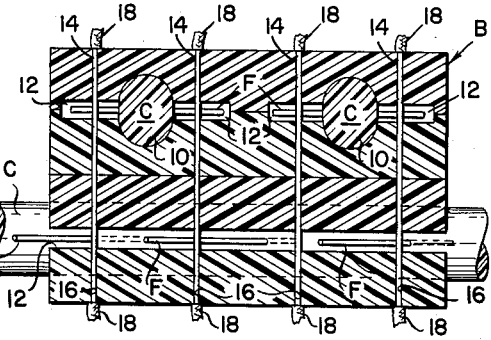
Fig.4
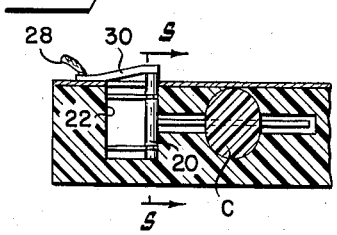
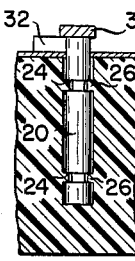
Fig.5
INVENTOR
Bernard Edward Shlesinger Jr Dec. 21, 1965  B. E. SHLESINGER, JR  3,225,149
PROGRAMMING SYSTEM-CABLE TAPE TYPE SWITCH
WITH DEFLECTABLE SPRING CONTACT MEANS
Filed July 27, 1964  3 Sheets-Sheet 2
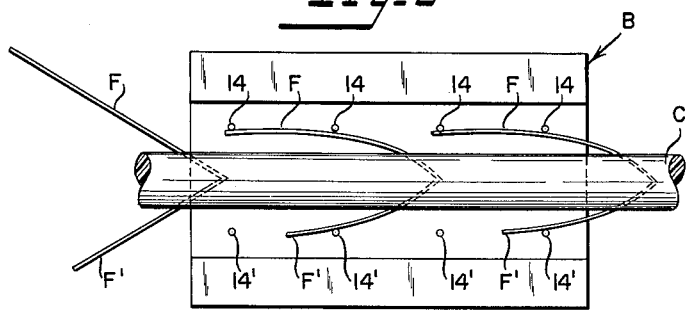
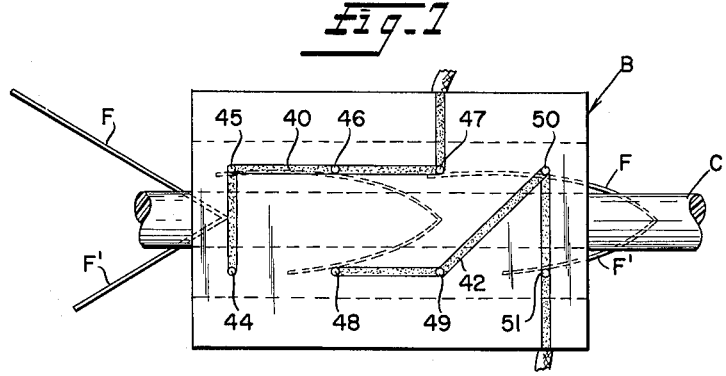
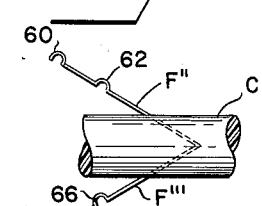
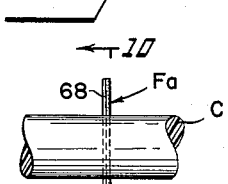
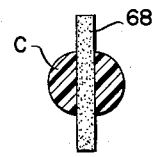
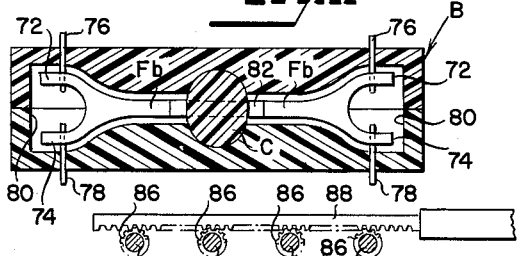
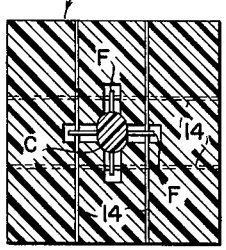
INVENTOR
Bernard Edward Shlesinger Jr Dec. 21, 1965
B. E. SHLESINGER, JR
3,225,149
PROGRAMMING SYSTEM-CABLE TAPE TYPE SWITCH
WITH DEFLECTABLE SPRING CONTACT MEANS
Filed July 27, 1964
3 Sheets-Sheet 3
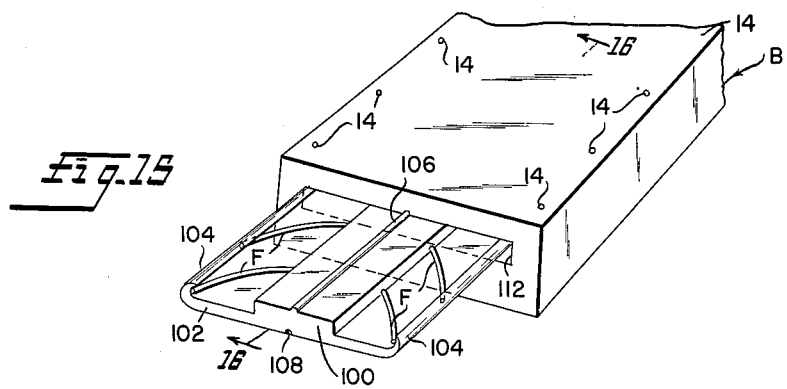
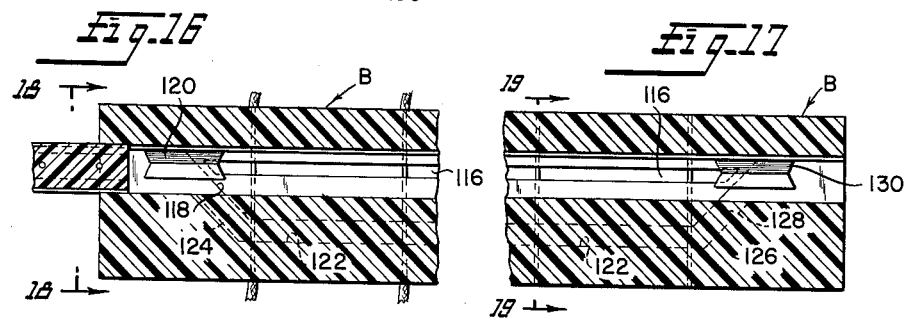
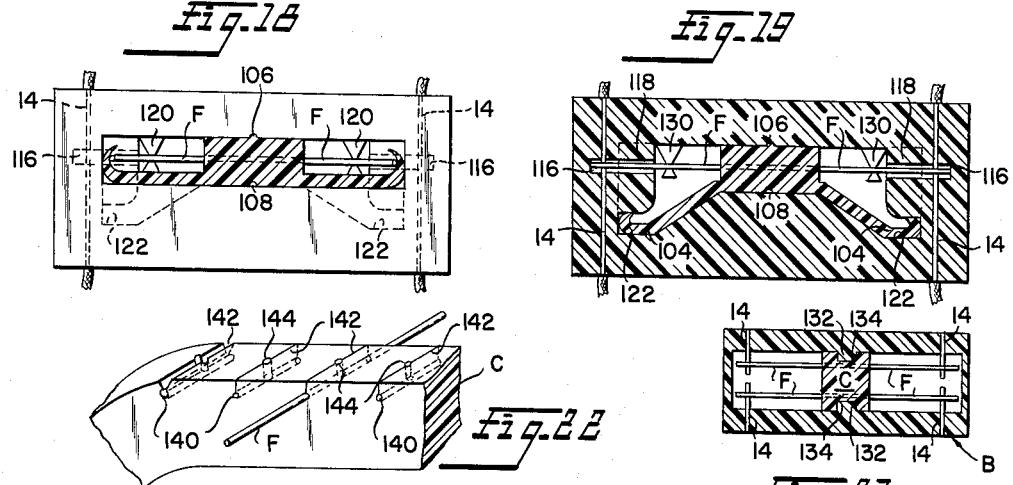
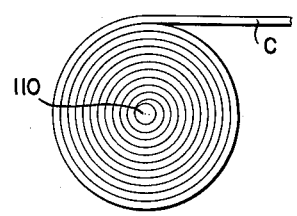
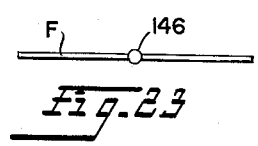
INVENTOR
Bernard Edward Shlesinger Jr United States Patent Office 3,225,149
Patented Dec. 21, 1965

3,225,149
PROGRAMMING SYSTEM-CABLE TAPE TYPE SWITCH WITH DEFLECTABLE SPRING CONTACT MEANS
Bernard Edward Shlesinger, Jr., 906 Bruce Lane, Annandale, Va.
Filed July 27, 1964, Ser. No. 385,348
31 Claims. (Cl. 200—16)

This invention pertains to multiple contact switches for programming and the like. In general it falls into the same category of switches as set out in my copending applications Serial Numbers 213, 977, filed August 1, 1962, entitled Multiple Contact Switch Programming System, now Patent 3,193,630, issued July 6, 1965; 268,321, filed March 27, 1963, for Multiple Contact Switch and Process, now Patent 3,166,645, issued January 19, 1965; and 322,659, filed November 12, 1963, for Magnetic Multiple Contact Programming Switch System.

In multiple contact switches, the problems of obtaining good wiping action, snap action, flexibility of equipment and the like have been solved by utilization of complex arrangements and components.

It is an object of this invention, therefore, to provide a multiple contact switch that is simple in construction and inexpensive to manufacture and one which will provide both fast action and good contact.

It is a further object of this invention to provide a multiple contact switch that may be used in programming systems, telemetering, telephony, and the like.

Yet another object of this invention is to provide a multiple contact switch that will provide a large number of different connections.

Still another object of this invention is to provide a multiple contact switch which will have a minimum number of parts and a maximum of efficiency of operation.

A further object of this invention is to provide a contact switch which is operable by any type of motor mechanism.

Yet another object of this invention is to provide a programming system which can be selectively changed without changing parts.

Still a further object of this invention is to provide a programming system which can be used in simple contact switching arrangements or in complex switching arrangements such as used in conjunction with pressure switches, micro-switches, as well as direct electrical connecting type switches.

Still a further object of this invention is to provide a programming system which is capable of being repetitive, or discontinuous as desired.

A further object of this invention is to provide a programming system which can be manufactured easily from plastic materials with a minimum of metallic parts.

Another object of this invention is to provide a programming system which is compact yet simple to maintain.

A further object of this invention is to provide a switching system which permits interchangeability of the programmed members in order to afford selective use of the system.

These and other objects of this invention will be apparent from the following description and claims.

In the accompanying drawings which illustrate by way of example various embodiments of this invention:

FIGURE 1 is a fragmentary top plan view of a typical cable tape as used in this invention.

FIGURE 2 is a cross sectional view of a switch block showing portions of cables running through the block.

FIGURE 2A is a diagrammatic view showing a variation of an arrangement somewhat similar to FIGURES 2 and 3.

FIGURE 3 is a cross sectional view taken along the lines 3—3 of FIGURE 2 and viewed in the direction of the arrows.

FIGURE 4 is a fragmentary cross sectional view illustrating a modification of this invention.

FIGURE 5 is a cross sectional view taken along the lines 5—5 of FIGURE 4 and viewed in the direction of the arrows.

FIGURE 6 is a cross sectional view showing a further modification of this invention.

FIGURE 7 is a top plan view of the block with a cable tape running therethrough showing a printed circuit arrangement.

FIGURES 8 and 9 illustrate two modifications of the cable tape and feelers extending therefrom.

FIGURE 10 is a cross sectional view taken along the lines 10—10 of FIGURE 9 and viewed in the direction of the arrows.

FIGURES 11 and 12 are cross sectional views illustrating further modifications of this invention.

FIGURE 13 is a fragmentary diagrammatic view illustrating a ratchet and pinion as used in the invention.

FIGURE 14 is a cross sectional view showing one modification of a feeler of this invention.

FIGURE 15 is a fragmentary perspective view showing a further modification of this invention.

FIGURE 16 is an enlarged fragmentary cross sectional view taken along the lines 16—16 of FIGURE 15 and viewed in the direction of the arrows.

FIGURE 17 is an enlarged fragmentary cross sectional view similar to FIGURE 16 but showing the other end of the block.

FIGURES 18 and 19 are views taken along the lines 18—18 and 19—19 of FIGURES 16 and 17 respectively and viewed in the direction of the arrows with FIGURE 19 showing a cable-tape in position.

FIGURE 20 shows a reel having a cable-tape wound thereon.

FIGURE 21 is a cross-sectional view showing a further modification of this invention.

FIGURE 22 is a fragmentary perspective view showing a belt-tape incorporating a feeler gripping feature.

FIGURE 23 shows a specific feeler utilized in the invention illustrated in FIGURE 22.

*FIGURES 1 through 3*

FIGURE 1 illustrates a cable-tape C which may be constructed of metal, plastic, or other material. The cable may be flexible or non-flexible as desired. It may be conductive or non-conductive as desired. Embedded in the cable at predetermined spaced intervals are feelers F. The feelers may be rigid or flexible, conductive or non-conductive, slender or fat as desired. The spaced interval between the feelers will be predetermined by the type of programming desired.

In FIGURE 2, a block generally indicated as B includes a series of passageways 10 which interconnect continuous slots 12 which may be spaced on both sides of the passageway 10 as illustrated or on one side if desired. As best shown in FIGURE 3, a series of pins or pegs 14 will be set in peg holes 16. The pegs or pins 14 may extend through the block as illustrated or a portion of the way into the block as desired. They may be conductive or non-conductive, as well as rigid or flexible. It will be obvious that if the feelers F are flexible, the pins may be rigid or flexible as desired. If the feelers F are rigid or inflexible, then the pins or pegs 14 must be flexible in order to allow the feelers F to deflect when the cable C is moved through the block B.

In FIGURE 2A, the slots 12 need not be spaced with a dividing strip as in FIGURES 2 and 3 and a single series of pegs 14 may be actuated by feelers of two spaced tapes C, one contacting one side of the pegs 14 and one contacting the other side. Longer feelers F or shorter slot distances will permit this dual contact. Thus, two tapes C can be used to actuate certain similar or interconnected circuits in different timed sequences.

The block itself may be of plastic, wood, metal or the like as well as either conductive or non-conductive depending upon the type of circuit involved. The slot 12 is so designed to permit free translation of the feeler F therein without binding. It may be thinner than illustrated so long as there is movement clearance.

In FIGURE 5 it is to be noted that the pins 14 are connected to leads 18 so as to make a circuit connection.

The shape of the cable C or the passageway 10 in the block B is such as to prevent rotation of the cable in the passageway. For purposees of illustration, FIGURE 3 shows the cable as being slightly oblong.

Operation of FIGURES 1 through 3

When any one of the tapes C are moved in the block B, the feelers F will engage the circuit members projecting into the block as for example the pins 14. In operation of the devices shown in FIGURES 1 through 3, the cable C is payed through the block B. In the case where the feelers F are flexible, and the pins or pegs 14 are inflexible, the feelers upon hitting the pegs 14, will deflect and cause a wiping action on the pin 14 in the holes 16. If micro-switches are used, a flexing of the pins 16 by a more rigid feeler F would cause an operation of the micro-switches. The figures show flexible feelers F which engage the pins or pegs 14 in the peg holes 16. If the pins are positioned rather closely together, a snap action will be obtained when the feeler jumps from one pin 14 to the next adjacent pin 14 due to the flexing of the feeler F. This of couse will not be the condition should the feeler F be rigid and the pin 14 be inflexible.

It will not be obvious that if a considerable length of cable tape is used, a large number of switching operations can be used if the cable is payed through in a timed sequence. The spacing of the feelers, the positioning of the pins, and the speed of the cable will be determining factors. It will also be obvious that the feelers need not be of V-shaped configuration as illustrated but can be straight members which will flex in either direction as hereinafter described. This will permit reversing of the cable. Though a cable-tape has been considered, it is also obvious that a solid rod may be used in which the feelers F are embedded. The rod would be an equivalent for the cable and would move in the passageway 10.

FIGURES 4 and 5

FIGURES 4 and 5 show a pin 20 in a slot 22. Grooves 24 in the pin 20 are engaged by tongues 26 in the block B. The pin may thus be moved from the path of travel of the feelers F to an out of the path of travel position with respect to the feelers F. A lead 28 can be connected to a flexible conducting post 30 which will be in contact engagement with the pin 20 for purposes of conducting a current to the pin 20. A handle or tab 32 is mounted on the pin 20 for purposes of shifting the pin 20 in the block B to the desired position whether in or out of contact or the like.

It is to be noted that the cable C for illustration purposes is somewhat oval in shape to prevent rotation of the cable-tape C in the block B. It will be obvious that any general type of arangement can be worked out to prevent rotation of the cable C in the block B. When the pin 20 in FIGURE 4 is moved to the left, the feelers will by-pass the pin without making contact therewith thus avoiding operation of that particular circuit.

FIGURES 6 and 7

In FIGURES 6 and 7, the upper feeler F is longer than the lower feeler F'. It is thus noted that the upper feeler F wipes a plural number of contacts or pegs 14 while the lower feeler F' wipes only 1 contact peg 14'. It will now be obvious that the length of the feelers can be varied to wipe a predetermined number of pegs or posts 14 and that the feeler on one side may be substantially longer than the feeler on the other side. It will also be further obvious that a circuit can be made between two posts 14 as well as post 14'. It will be further obvious that if the feeler F' is deleted, a circuit will be made between two of the posts 14 as illustrated in FIGURE 6.

FIGURE 7 shows a printed circuit arrangement on the block B including a first printed circuit 40 and a second printed circuit 42. It will be noted that the cable C and the feelers F and F' thereon will initially contact pegs 44 and 45. Subsequently contact will be made on posts 45 and 46 eliminating posts 44 and picking up post 48. In the third stage, posts 46, 47 and 49 will be contacted eliminating posts 45 and 48. In the fourth stage, posts 47, 50 and 51 will be contacted eliminating posts 46 and 49.

From the above it will be obvious that various control combinataions can be made to allow for holding and releasing of different circuits as desired.

FIGURES 8, 9 and 10

FIGURE 8 shows a cable C with a different type of feeler F''. The feeler has projecting portions 60 and 62. The projecting portions 60 and 62 are designed to afford a good wiping contact with the posts in the block B. They also serve as a means for by-passing any subsequent post which might be in the path of the feeler F''. In operation, projection 62 will engage the first post in line and the feeler F'' will be forced inwardly towards the cable C. Should there be a second post immediately adjacent the post in contact with the projection 62, the feeler will not engage with that post due to the projection 62. Projection 60 would be provided where posts will be spaced the same distance away as projection 62 in order to afford contact with two posts simultaneously even when engagement with the projections 60 and 62.

Feeler F''' in FIGURE 8 is provided with recesses 64 and 66 which work somewhat in the reverse of projection 60 and 62. A by-pass will be made at the point of recess with any contact posts which might be in the area of recess when the feeler F''' is moved with the cable.

In FIGURE 9, a slightly different feeler member Fa is provided. This feeler member is not angled with respect to the cable C but extends in a plane normal to the axis of the cable C. In this instance, the feeler Fa may have a non-conductive surface 68 and a conductive surface 70. The non-conductive surface may be provided at the forward or rear portion of the feeler Fa depending upon the direction of travel. It will now be obvious when the cable C is passed in one direction, no contact will be made when the non-conductive surface is presented to the posts or pegs such as 14 in FIGURE 6. When the cable C is reversed, the conductive surface 70 will make contact as desired.

FIGURE 11

In the modification illustrated in FIGURE 11, the feelers Fb are bifurcated as illustrated. The bifurcated ends comprise two furcations 72 and 74. Posts 76 and 78 extend through the block B and into the slot areas 80. When the cable C moves through the block B, the furcations 72 engage the posts 76 and the furcations 74 engage the posts 78. As illustrated in FIGURE 11, the feeler Fb may have a central portion 82 which is non-conductive so that separate switching operations can be obtained between each end of the feeler B. If desired, the furcations 72 and 74 may be offset in different parallel planes rather than aligned in the same plane in order to afford various combinations,

FIGURES 12 and 13

From the above, it will now be obvious that the posts, pegs or pins 14 may be coated on one side with a non-conductive coating 84. If the posts or pins 14 are made rotable in their respective pin holes, a small pinion 86 may be provided at the end of each post 14 to engage a rack 88 which may be solenoid driven or actuated by some other mechanism not shown. When required, the non-conductive surface of the posts 14 as illustrated in FIGURE 13 may be presented to the wiping surface of the feelers F for a programmed sequence and subsequently may be rotated to the conductive side of the posts 14 for a different sequence.

FIGURE 14

FIGURE 14 is illustrative of a block in which the feelers F project radially in four directions from the cable C and in which the conductive pins 14 extend in transverse directions to obtain various combinations of circuitry as will be obvious. It will also be obvious that any other arrangement of a plural number of feelers and their corresponding slots can be worked out whether it be 2 or more and the feelers need not be arranged in the same plane nor do they have to be on opposite sides of the cable C as illustrated but may project at various angles depending upon the type of equipment used.

FIGURES 15 through 20

In FIGURES 15 through 20, the tape or cable C comprises a central portion 100 with side portions 102 having lips 104. Feelers F are embedded in the central portion 100 and when in non-use position, engage and are held by the lips 104. The extended side portions 102 are preferably of plastic or some resilient type material though it is contemplated that the whole tape C be of plastic or other resilient or flexible material. The cable or tape C includes a bead 106 and a recess 108 for nesting and aligning purposes and specifically as illustrated in FIGURE 20 for mounting on a reel 110 for preventing lateral slippage.

The block B incorporates a series of contact pegs or pins 14 which are positioned outside of the path of the tape C when the feelers F are sheathed. The block B is provided with a slot 112 for receipt of the tape C. The slot 112 includes a central passageway portion 114 as best seen in FIGURES 18 and 19 and feeler slots 116. A projecting cam shoulder 118 is provided for camming the lips 104 downwardly. In advance of the camming shoulder 118, is a feeler deflector 120 which extends back at least to the cam shoulder 118. Lip travelling slots 122 are provided for the lip 104. The pins 14 as noted pass through the block B and through the slots 116.

The lip slots 122 have an initial downward slope 124 and a final upward slope 126. A camming surface 128 is provided in the slot 126.

Operation of FIGURES 15 through 20

In operation of the invention illustrated in FIGURES 15 through 20, the tape C moves initially into the block as illustrated in FIGURE 16. The deflector members 120 engage the feelers F and move them inwardly towards the central portion 100 of the tape C. Subsequently, the cam surfaces or shoulders 118 engage the lips 104 of the tape C and deflect them downwardly into downward portion 124 of the lip slot 122 which holds them downwardly as illustrated in FIGURE 19. When the feelers F have travelled beyond the end of the feeler deflectors 120, they then spring into the feeler slot 116 and project laterally beyond the lip 104 and into engagement with the pins or pegs 14 as best illustrated in FIGURE 19. Contact is made throughout the block B by the feelers as they progress from one peg 14 to another. At the end of the block B the lips 104 engage the camming surface 128 of the upward extending portion 126 of the lip slot 122. The lips then travel upward into position for receiving and sheathing the feelers F which have been travelling in the slot 116. The feelers engage a deflector surface 130 and are forced inwardly until they pass the deflector 130 whence they are released within the lips 104 of the tape C. It is to be noted that the deflectors 120 and 130 are somewhat hourglass shaped in order to assure that the feelers will be positioned properly within the lips 104.

It will now be obvious that the cable may be fed in either direction through the block B and that the spring fingers F will deflect in either direction depending upon the direction of travel of the cable C. In the figures shown, the direction of travel is in the direction of the arrow as illustrated in FIGURE 15.

The block B may be made in parts which are subsequently assembled or by any other manufacturing procedure. It will also be obvious that the cable C need only have one extending side 102 rather than two as shown.

FIGURE 21

FIGURE 21 illustrates a plural stacking arrangement of the feelers F. In this instance the block B is provided with projections 132 which engage recesses 134 in the cable C. The top feelers F engage the top pins 14 whereas the bottom feelers F engage the bottom pins 14. It will now be obvious that various other types of arrangements can be worked out with multiple feelers in stacked relationship.

FIGURES 22 and 23

In FIGURE 22, the cable C is of flexible material and is designed to hold a series of removable feelers F. In this instance, the tape C will have a series of transverse pinholes 140. The pinholes will be normally spaced an equal distance apart. The pinholes will be located a reasonable distance from the top surface of the tape and will be connected to the top surface thereof by a slit 142. An enlarged opening 144 which may be centrally located in the slit 142 will extend from the top surface of the tape C to the pinhole 140. Because of the flexibility of the tape C, a slight flexing of the tape will widen the slit 142 as illustrated in FIGURE 22 to permit the feeler to be positioned in the pinhole 140. The feeler F as illustrated in FIGURE 23 will have a bead member 146 which will be positioned in the vertical passageway or opening 144. When the feeler F is pushed down into the slit 142 and bottoms on the pinhole 140, the bead 146 will prevent lateral movement of the feeler due to the fact that it is locked against lateral movement by the opening 144.

From the above, it will now be obvious that by spacing the holes 16 in the block B a specified distance apart, and likewise by positioning the pinholes 140 in the tape C a specified distance apart, programming arrangements can be worked out by inserting or removing pegs 14 in the peg holes 16 or by removing or inserting feelers F in the pinholes 140 of the cable C.

It is obvious that any one of the various modifications illustrated can include the removable feeler feature to provide flexibility of operation. It is also obvious that any motor mechanism can be used for moving the cable tape through the block whether mechanical or electrical.

Variations

Various other modifications can be made to the invention as for example, the passageway in the block B may be smaller than the slots which extend outwardly therefrom and may in some instances merge therewith without clear definition. It will also be obvious that the feeler members F may be of various configurations.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention per-

Having thus described my invention what I claim is:
1. A programming system comprising
   (a) a block
   (b) at least one passageway extending through said block
   (c) at least one continuous slot interconnected and coextensive with said passageway
   (d) a longitudinally extending movable circuit actuator slidably mounted for axial movement in said passageway and extending into, through, and out of said passageway
   (e) means in said block for preventing rotation of said actuator
   (f) said actuator including a plurality of radially extending spaced feeler members secured to said actuator and extending into and travelling in said slot
   (g) at least one fixed circuit in said block having circuit operating means extending into said slot into the path of travel of said feeler members,
   (h) said circuit operating means and said feeler members including spring deflecting means for permitting said feeler members to pass said circuit operating means whereby when said actuator is moved in said pasageway, said feeler members move in said slot and engage said circuit operating means thereby operating said circuit in a programmed sequence as determined by the spacing of said feeler members and the rate of travel of said actuator.
2. A program system as in claim 1 and including
   (a) a plurality of said continuous slots spaced radially about said pasageway, and
   (b) at least one of said fixed circuits extending into each slot.
3. A program system as in claim 1 and wherein
   (a) said circuit operating means includes a pair of spaced conductive posts, and
   (b) said feeler members are conductive whereby when said feeler members contact said posts, said circuit is closed.
4. A program system as in claim 1 and wherein
   (a) said circuit operating means includes a pressure sensitive device actuated by said feeler members.
5. A program system as in claim 1 and wherein
   (a) said spring deflecting means is an integral part of said feeler members.
6. A program system as in claim 1 and wherein
   (a) said spring deflecting means is an integral part of said circuit operating means.
7. A programming system as in claim 1 and including
   (a) a plurality of said central passageways each including a circuit actuator
   (b) and said slot interconnecting at least two of said passageways.
8. A programming system comprising
   (a) a block
   (b) a plurality of passageways extending through said block
   (c) each of said passageways having at least one continuous slot interconnected and coextensive with said passageway.
   (d) a longitudinally extending movable circuit actuating cable extending into, through, and out of each of said passageways slidably mounted for axial movement therein
   (e) means in said block for preventing rotation of said actuating cables in said passageways
   (f) said actuating cables including a plurality of radially extending axially spaced feeler members secured thereto and extending into and travelling in said slot
   (g) a plurality of circuits in said block having circuit operating means at least one extending into each of said slots and into the path of travel of said feeler members
   (h) said circuit operating means and said feeler members including spring deflecting means for permitting said feeler members to pass said circuit operating means thereby operating said circuit in a programmed sequence.
9. A programming system as in claim 8 and wherein
   (a) said feeler members are resilient spring fingers extending from said cable.
10. A programming system as in claim 8 and wherein
    (a) said circuit operating means includes a series of spaced parallel pegs extending into eacth of said slots and into the path of travel of said feeler members.
11. A programming system as in claim 8 and wherein
    (a) said passageways include a first series transverse to a second series of passageways.
12. A programming system as in claim 8 and wherein
    (a) said feeler members are resilient spring fingers angularly extending rearwardly from said cable.
13. A programming system as in claim 1 and wherein
    (a) said circuit operating means includes a series of spaced parallel removable pegs extending into said slot and into the path of travel of said feeler members.
14. A programming system as in claim 8 and wherein
    (a) said circuit operating means includes a series of spaced parallel removable pegs extending into each of said slots and into the path of travel of said feeler members.
    (b) said pegs and feeler members being conductive.
15. A programming system as in claim 13 and wherein
    (a) said pegs are coated on one side with a non-conductive coating.
16. A programming system as in claim 15 and wherein
    (a) said pegs are rotatable from a conductive to a nonconductive position.
17. A programming system as in claim 13 and wherein
    (a) said pegs are movable from a conductive to a non-conductive position.
18. A programming system as in claim 13 and wherein
    (a) said feeler members include wiper means for cleaning said pegs.
19. A programming system as in claim 13 and wherein
    (a) said feeler members are coated on one side with a non-conductive coating.
20. A programming system as in claim 13 and wherein
    (a) said feeler members extend through said cable and project further out one side than the other.
21. A programming system as in claim 13 and wherein
    (a) said feeler members extend from said cable a distance sufficient to bridge the gap between two adjacent pegs.
22. A programming system as in claim 16 and wherein
    (a) said block includes means for simultaneously rotating a series of said pegs from one position to another.
23. A programming system as in claim 1 and wherein
    (a) said feeler member includes a bifurcated end,
    (b) and said circuit operating means includes a pair of spaced contactors extending into said slot
    (c) and each contactor of said pair engaging only one furcation of said feeler end.
24. A programming system as in claim 23 and wherein
    (a) said circuit operating means and said bifurcated feeler ends are conductive whereby the circuit between said pair of contactors is bridged upon contact by said bifurcated ends.
25. A circuit actuator for use in a programming system including
    (a) a longitudinally extending member having antirotation means thereon
    (b) said member including a series of feelers extending in the same plane outwardly therefrom and
    (c) said longitudinally extending member including a sheath for said feelers.

26. A circuit actuator as in claim 25 and wherein
(a) said sheath includes a resilient side skirt
(b) said side skirt having curved back on itself ends for the purpose of maintaining said feelers covered when not in use.
27. A programming system as in claim 1 and wherein
(a) said block includes a cam surface for camming said circuit actuator to expose said feelers for extension into said slot.
28. A programming system as in claim 27 and wherein
(a) said block includes a second cam surface for sheathing said actuator subsequent to operation of said circuit.
29. A programming system as in claim 1 and wherein
(a) said circuit actuator includes a nesting surface.
30. A programming system as in claim 1 and wherein
(a) said radially extending axially spaced feeler members include at least one feeler member vertically spaced from another feeler member.
31. A circuit actuator as in claim 25 and including
(a) at least one feeler mounted in spaced relation above another of said feelers.

References Cited by the Examiner

UNITED STATES PATENTS

| | | | |
|---|---|---|---|
| 2,809,361 | 10/1957 | Woofter et al | 339—59 X. |
| 2,999,912 | 9/1961 | Kincaid et al. | 200—16 X. |
| 3,166,645 | 1/1965 | Shlesinger | 200—16. |
| 3,193,630 | 7/1965 | Shlesinger | 200—163 X. |
| 3,200,208 | 8/1965 | Mastney | 200—14 X. |

FOREIGN PATENTS 659,728   10/1951   Great Britain.

OTHER REFERENCES

ROBERT S. MACON, *Acting Primary Examiner.*
KATHLEEN H. CLAFFY, *Examiner.*
J. R. SCOTT, *Assistant Examiner.*